Feb. 17, 1959 J. R. OMPS 2,873,994
RESILIENTLY MOUNTED BUMPER FOR VEHICLES
Filed May 17, 1954 2 Sheets-Sheet 1
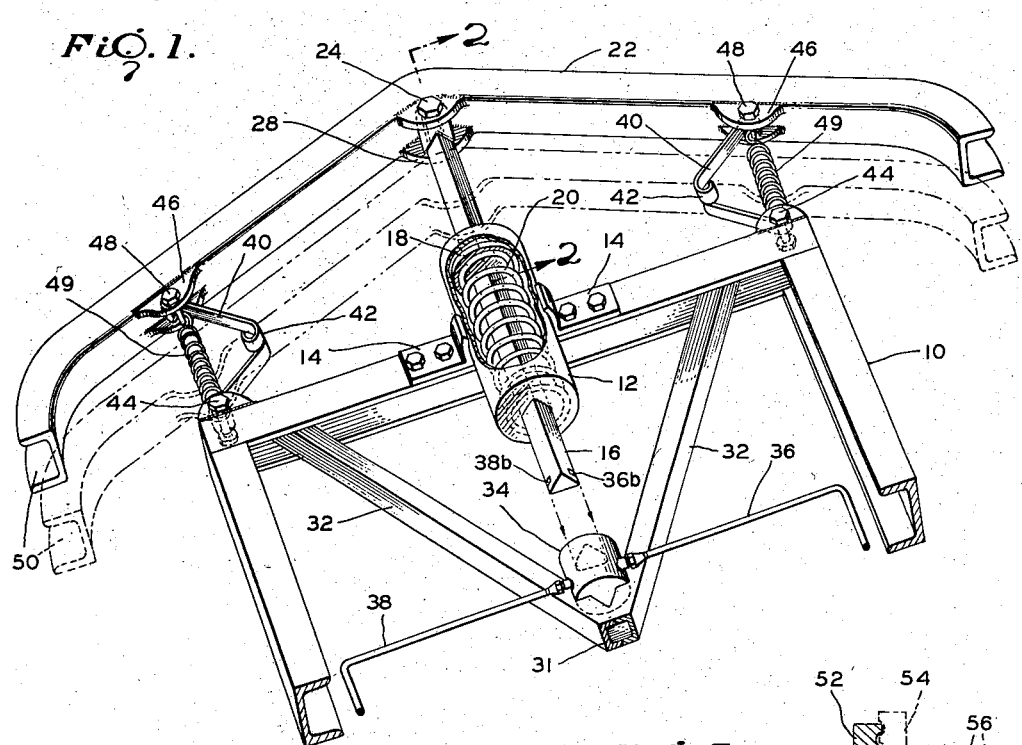
Fig. 1.
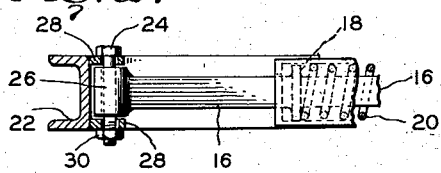
Fig. 2.
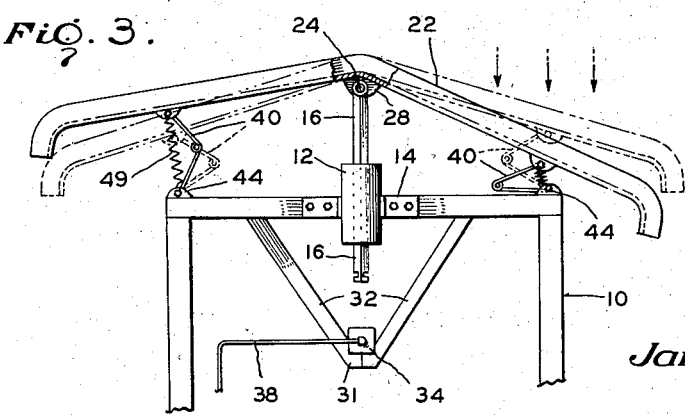
Fig. 3.
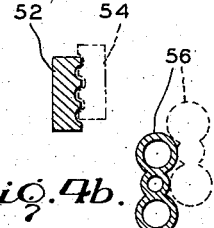
Fig. 4a.
Fig. 4b.
Fig. 4c.
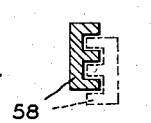
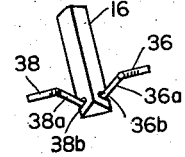
Fig. 1a.
INVENTOR
James Ray Omps.
BY
Gustave Miller
ATTORNEY

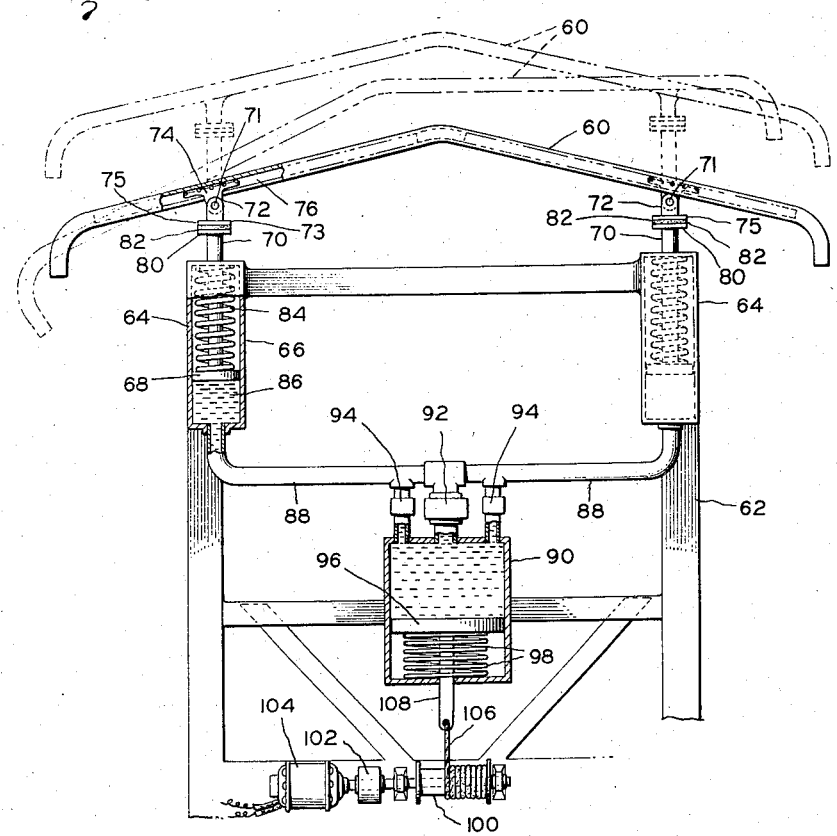

United States Patent Office 2,873,994
Patented Feb. 17, 1959

2,873,994
RESILIENTLY MOUNTED BUMPER FOR VEHICLES

James Ray Omps, Elkins, W. Va.

Application May 17, 1954, Serial No. 430,053

1 Claim. (Cl. 293—86)

This invention relates to a bumper device for automobiles, and particularly relates to a bumper device which is resiliently connected to the chassis of a vehicle so as to absorb the greater proportion of the shock of collision, especially with another vehicle.

There have been many previous attempts to devise a resiliently mounted bumper device for vehicles, but none of these prior attempts has proven mechanically or economically feasible because these prior devices have either not been capable of absorbing a sufficient amount of force without breaking or have been so complex in structure and so difficult and expensive to construct and maintain as to make them commercially unfeasible.

One object of this invention, therefore, is to provide a resiliently mounted bumper assembly for vehicles which is capable of absorbing a large amount of shock without breaking.

Another object of this invention is to provide a resiliently mounted bumper assembly which is capable of absorbing the shock of large forces both from head-on blows and from glancing side-blows.

Another object of this invention is to provide a resiliently mounted bumper assembly which is relatively simple in construction and which has comparatively few parts.

Other objects of this invention are to provide an improved bumper assembly of the character described, that is easily and economically produced, which is sturdy in construction, and which is highly effective in operation.

With the above and related objects in view, this invention consists in the details of construction and combination of parts, as will be more fully understood from the following description when read in conjunction with the accompanying drawings in which:

Fig. 1 is a perspective view, partly broken away, of one embodiment of the invention.

Fig. 1a is a fragmentary view showing the locking mechanism.

Fig. 2 is a fragmentary view, partly in elevation and partly in section, taken on line 2—2 of Fig. 1, showing the main cylinder shaft attached to the bumper.

Fig. 3 is a side elevational view of the embodiment of Fig. 1, showing the displacement position of the bumper when a shock force is angularly imposed on one side of the bumper.

Fig. 4a is a cross-sectional view of one type of bumper configuration.

Fig. 4b is a cross-sectional view of another type of bumper configuration.

Fig. 4c is a cross-sectional view of a third type of bumper configuration.

Fig. 5 is a top plan view, partly in elevation and partly in section, showing a second embodiment of the invention.

Fig. 6 is a view similar to Fig. 5, but showing a third embodiment of the invention.

Fig. 7 is an enlarged fragmentary detailed view of the bumper and slide-bar construction.

Fig. 8 is a cross-sectional view taken on line 8—8 of Fig. 7.

Referring now in greater detail to the drawing wherein similar reference characters refer to similar parts, there is shown an automobile chassis 10 on which is mounted a cylinder 12 by means of a bracket 14. Extending through the cylinder 12 is a rod 16 provided with a flange 18 internally of the cylinder. The rod 16 and flange 18 form a plunger or piston which is urged outwardly by means of a coil spring 20 positioned within the cylinder. The rod 16 may be of any one of several shapes such as cylindrical, square or triangular. However, either the square or rectangular shape, or the triangular shape, such as illustrated in Fig. 1, is preferred, since this prevents turning of the rod within the cylinder.

The upper end of the rod 16 is pivotally connected to a bumper bar 22 by means of a pivot bolt 24 extending through a sleeve 26 at the end of the rod, the bolt extending through opposed ears 28 on the bumper bar. A nut 30 holds the bolt 24 in place in the ears 28. A pair of angular braces 32 extend from the chassis 10 and meet at an apex 31 at which position there is provided a locking mechanism, generally indicated at 34. This locking mechanism comprises a housing in which is preferably provided a pair of spring detents or the like, indicated at 36–a and 38–a in Fig. 1a, which normally clamp into the end of the rod 16 by engaging in holes 36–b and 38–b in the rod 16. Actuating rods 36 and 38 are each pivotally connected at one end to one of these detents, and at their other ends they are connected to a brake pedal. When the brake pedal is depressed with a predetermined force, the detents are actuated by the rods 36 and 38 to the open position by being forced out of the holes 36–b and 38–b, and the rod 16 is released. When the rod 16 is released, the spring 20 automatically acts on the plunger head 18 to move the rod 16 and therefore the bumper 22, outwardly. If there is an impact against the central portion of the bumper, the shock is absorbed by the spring 20 as the bumper and rod 16 are moved in. Although the detents have been described as mechanically connected to the brake pedal, it is within the scope of this invention to use the hydraulic fluid of the brake cylinder to actuate the detents upon a predetermined pressure from the brake pedal.

At each side of the bumper assembly described above there is provided an additional shock absorber unit comprising a spring metal band 40, coiled in the center, as at 42, and pivotally fixed to the chassis at one end, as at 44, and at the other end, to ears 46 on the bumper, as at 48. A coil spring 49 extends between the pivotal connections of each of the springs 40. Each spring 40 acts to urge the bumper outwardly and each spring 49 acts to urge the bumper inwardly. These side spring assemblies are adapted to take the shock of glancing side blows with the central shock absorbing system acting as a pivot, as best seen in Fig. 3.

The bumper bar 22 is illustrated in Fig. 1 as being channel-shaped on its outer surface, as at 50. This particular configuration is important since it enables the bumper to lock with a similar bumper on another similarly equipped vehicle. This interlocking enables the bumpers to take the full shock of the collision. In Figs. 4a, 4b and 4c there are illustrated three other types of bumpers having configuration which enables interlocking at time of collision. In Figs. 4a, the bumper 52 is shown as generally corrugated in cross-section to mate with a similar type bumper shown in dotted outline at 54. In Fig. 4b, the bumper 56 comprises three varying shaped tubes, while in Fig. 4c, the bumper 58 is shown as E-shaped. Other suitable configuration may also be used within the scope of the invention.

In Fig. 5 there is shown a second embodiment of the invention wherein the bumper bar 60, generally similar to bumper bar 22, is connected to the chassis 62 through fluid pressure type shock absorbers, indicated generally at 64. The shock absorbers 64 are provided at the end portions of the bumper bar, and no central shock absorber, such as provided in the first embodiment, is used here. The shock absorbers 64 are adapted to absorb the shock of any force exerted against the bumper, whether delivered frontally or edgewise.

Each of the shock absorbers 64 comprises a housing 66 having a plunger 68 therein. Each plunger 68 is provided with a stem 70 extending out of the housing toward the bumper bar. Each stem 70 is pivoted by a pivot pin 71 at its end to a bracket 72 which is integral with an extension 73 of a bar 74. The bar 74 slidably engages within a rear channel 76 formed in the bumper bar and is provided with a plurality of roller bearings 78 adapted to roll along the internal wall of the channel. It should be noted here that although the outer surface of the bumper bar 60 is illustrated in Figs. 7 and 8 as being flat, this is only for simpler illustration since this surface is actually preferably contoured according to the teachings illustrated in Figs. 1, 4a, 4b and 4c.

A flange 80 is provided on each stem 70 adjacent the extension 73, which also has a flange 75 and between these flanges is provided a resilient washer 82 made of rubber or the like. This resiliently covered flange acts as a stop to limit inward movement of the plunger into the housing.

A coil spring 84 surrounds the stem 70 within the housing to bias the plunger 68 downwardly against the force of pressure fluid 86. A conduit 88 connects each housing 64 to a fluid pressure tank 90 through a one-way pressure valve, indicated generally at 92, which is an ordinary check valve, and through a pair of ordinary one-way return check valves 94. The fluid which may be either pneumatic or hydraulic, is maintained under pressure within the tank 90 by a piston 96 urged upwardly by a spring 98.

In operation, when a force is exerted against the bumper in any direction, the shock is taken by the pressure fluid 86 in the housings 64 through the plungers 70. As the bumper bar retracts under the force exerted thereon, the stems 70 of the plungers are held vertical due to their slidable connection with the bumper bar through the pivoted slide bars 74. The pressure of the fluid is exerted through the pressure valve under the force of the plunger 68, against the piston 96, this pressure being exerted against the counter-force of the spring 98. After the force of the shock is removed, the spring 98 forces the piston 96 forward to effect a return of fluid pressure to the housings 64 through return valves 94. This causes the plungers 68 to move back into their extended positions against the counterforce of springs 84.

The regulation of the amount of extension of the bumper 60 beyond the chassis may be effected through means similar to those illustrated in Fig. 1 wherein a locking mechanism may be used to hold the bumper retracted until released by actuation of the brake pedal. However, a finer adjustment of the bumper may be provided through the mechanism illustrated in Fig. 5, this mechanism comprising a winch 100 connected through gear reduction means 102 to a motor 104. The motor 104 is suitably connected either to the wheels of the vehicle or to its engine by any desired conventional means in such a manner that its activation is governed by the speed of the vehicle. The motor may be so connected to the vehicle, through a solenoid switch or the like that it will not function until a predetermined engine speed is reached or a predetermined R. P. M. is reached by the wheels. At this time, the motor will be energized to operate the winch which, in turn, pays out its cable sufficiently to allow the spring 98 to move piston 96 upwardly. Upon the vehicle being slowed to below the predetermined speed, the motor again becomes inoperative, at which time a suitable means, such as a torsion spring, not shown, rotates the winch back to its original position, bringing the piston 96 back to its retracted position against the force of spring 98. In this manner, the bumper is extended further forward when the danger of collision is greatest and is retracted when the vehicle is moving slowly, such as in heavy traffic or when parking.

A third embodiment of the invention is illustrated in Fig. 6 wherein the fluid pressure shock absorbing means 108 are similar to those shown at 64 in Fig. 5. The connection of these shock absorbers to bumper bar 110 through slide bars 112 on plunger stems 114 is also similar to the corresponding parts in Fig. 5. The shock absorbers 108 are connected through conduits 116 and pressure valve 118 to a bellows 120 connected to a cross-bar on the chassis 122 through a bowed spring metal strip 124.

The operation of the structure of Fig. 6 is obvious in that upon the exertion of a shock force on the bumper, pressure fluid is forced into the bellows, expending it; upon removal of the force, the spring 124 forces the fluid out of the bellows back into the units 108.

Although this invention has been described in considerable detail, such description is intended as being illustrative rather than limiting, since the invention may be variously embodied and the scope of the invention is to be determined as claimed.

Having thus set forth and disclosed the nature of this invention, what is claimed is:

In a resilient bumper for vehicles, the combination of a vehicle frame including longitudinally extending side members, a cylinder mounted longitudinally on each side member at the forward end thereof, a piston in each cylinder, a piston rod connected to each said piston and extending out of the forward end of each cylinder, a coil spring in each cylinder biasing each piston towards the rear of its associated cylinder, a flange on each piston rod exteriorly of its cylinder, a resilient stop washer on each flange, a flanged extension secured to each of said first-mentioned flanges, a channel shaped bumper bar extending across the front of said frame, a bar adjacent each end of said bumper bar and slidable therein, bearings between each bar and said bumper bar, a pivot connecting each said bar to an adjacent flanged extension, a fluid pressure tank mounted on said frame, a fluid connection including a T having its stem connected to said pressure tank between said pressure tank and each of said cylinders, a one-way check valve in the stem of said T precluding flow of fluid to said pressure tank, an independent return line from said fluid connection to said pressure tank for each cylinder on opposite sides of the arms of said T, a one-way check valve in each return line precluding flow of fluid from said pressure tank, a piston in said pressure tank, and a spring biasing said last-mentioned piston forwardly, whereby an impact on said bumper bar will force the piston in one or both cylinders against the pressure of fluid therein to compress the spring in said pressure tank to permit yielding of said bumper bar.

References Cited in the file of this patent

UNITED STATES PATENTS

| Number | Name | Date |
|---|---|---|
| 278,328 | Gallinant | May 29, 1883 |
| 345,552 | Stanley | July 13, 1886 |
| 407,103 | Mussey | July 16, 1889 |
| 1,504,505 | Reed et al. | Aug. 12, 1924 |
| 1,702,675 | Ventura | Feb. 19, 1929 |
| 2,508,836 | Morris | May 23, 1950 |
| 2,555,436 | Druilhet | June 5, 1951 |
| 2,600,060 | Lopes et al. | June 10, 1952 |
| 2,606,785 | Fisher | Aug. 12, 1952 |

FOREIGN PATENTS

| Number | Country | Date |
|---|---|---|
| 354,637 | Great Britain | Aug. 13, 1931 |